IN-THE-EAR HEARING AID
Original Filed April 2, 1964 2 Sheets-Sheet 1
FIG. 1
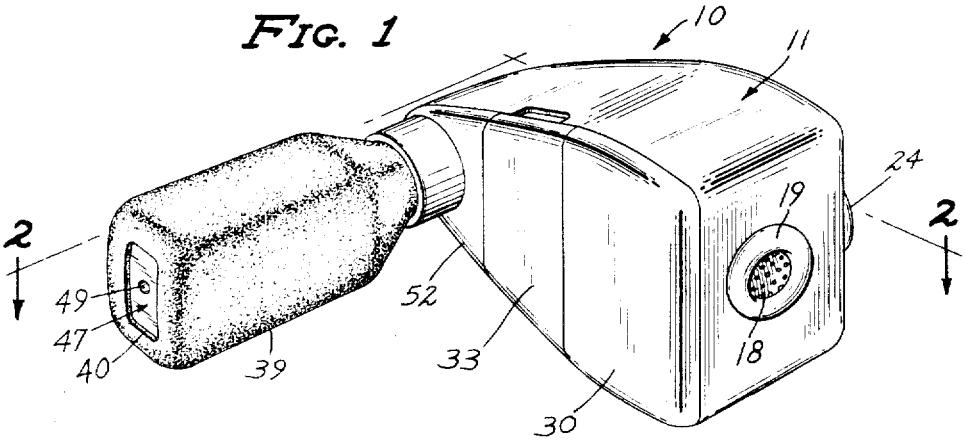
FIG. 2
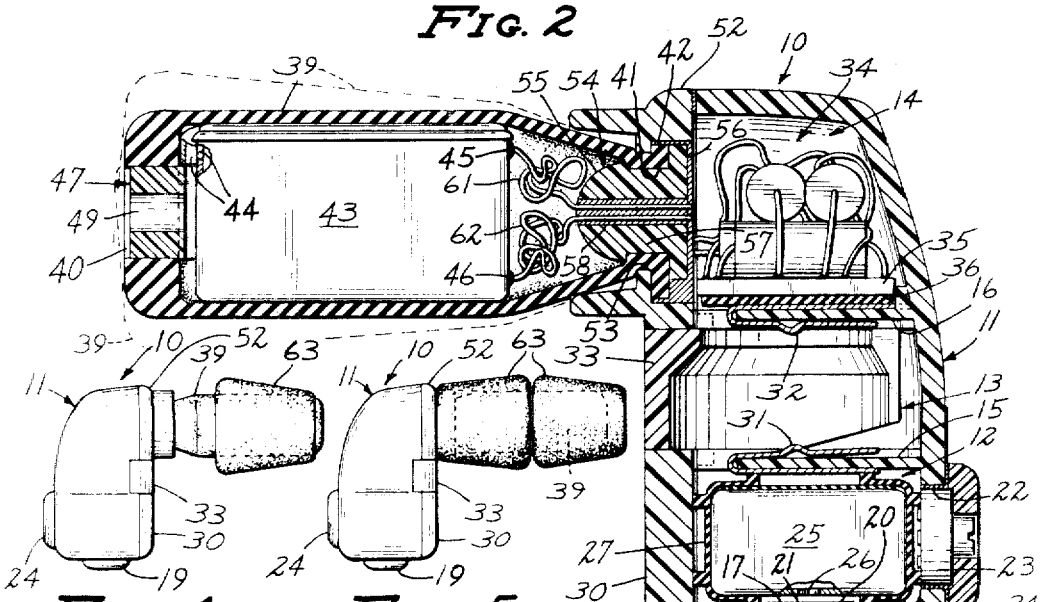
FIG. 4
FIG. 5
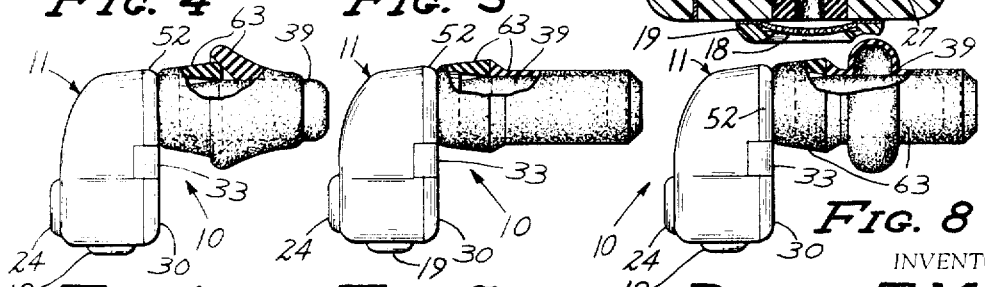
FIG. 6
FIG. 7
FIG. 8
INVENTOR.
RICHARD T. MARTIN
BY
Merchant, Merchant & Gaul
ATTORNEYS Aug. 29, 1967 R. T. MARTIN Re. 26,258

IN-THE-EAR HEARING AID

Original Filed April 2, 1964 2 Sheets-Sheet 2

INVENTOR.
RICHARD T. MARTIN
BY
Merchant, Merchant & Gould
ATTORNEYS

United States Patent Office

Re. 26,258
Reissued Aug. 29, 1967

26,258
IN-THE-EAR HEARING AID

Richard T. Martin, Minneapolis, Minn., assignor to Dahlberg Electronics, Inc., Minneapolis, Minn., a corporation of Minnesota Original No. 3,197,576, dated July 27, 1965, Ser. No. 356,803, Apr. 2, 1964. Application for reissue Dec. 3, 1965, Ser. No. 515,294
12 Claims. (Cl. 179—107)

Matter enclosed in heavy brackets [ ] appears in the original patent but forms no part of this reissue specification; matter printed in italics indicates the additions made by reissue.

This invention pertains to improvements in hearing aids, and more particularly to improvements in an in-the-ear hearing aid which is designed to be worn in the external ear of the user.

It is one object of the present invention to provide a miniaturized hearing aid which fits completely in the ear of the user.

Another object of this invention is to provide a miniaturized hearing aid including a housing containing a microphone, amplifier and battery and an elongated receiver member pivotally connected to said housing and adapted to be inserted in the ear canal of the user.

Still another object of this invention is to provide a miniaturized hearing aid having a housing and an elongated receiver member and having an improved means providing a pivotal connection between the receiver member and the housing.

A further object of this invention is to provide a miniaturized hearing aid having an elongated receiver member for insertion in the ear canal of the user and having a soft resilient tip fitted over the receiver member and shaped to the ear canal of the user to hold the receiver member therein.

Still another object of this invention is to provide a miniaturized hearing aid having a compartmentized housing wherein a microphone and amplifier are each mounted in separate compartments separated by a battery compartment to provide isolation between the microphone and amplifier to reduce feed back effects.

A further object of this invention is to provide a miniaturized hearing aid having an elongated receiver member capable of producing an acoustic output from one end thereof, the receiver member being adapted for insertion in the ear canal of the user with the acoustic output end adjacent the ear drum of the user, and a soft resilient tip fitted over the receiver and fitted to the shape of the ear canal of the user to hold the receiver therein.

These and other objects of this invention will become apparent to those skilled in the art upon consideration of the accompanying specification, claims, and drawings.

Referring to the drawings, wherein like characters indicate like parts throughout the several views:

FIG. 1 is a perspective view of the present invention;

FIG. 2 is a sectional view taken along a line 2—2 of FIG. 1;

FIGS. 4–8 show various modifications of soft resilient tips which can be fitted over the elongated receiver member of the hearing aid and shaped to the ear canal of the hearing aid user, parts thereof being broken away and shown in section.

Figure 3:
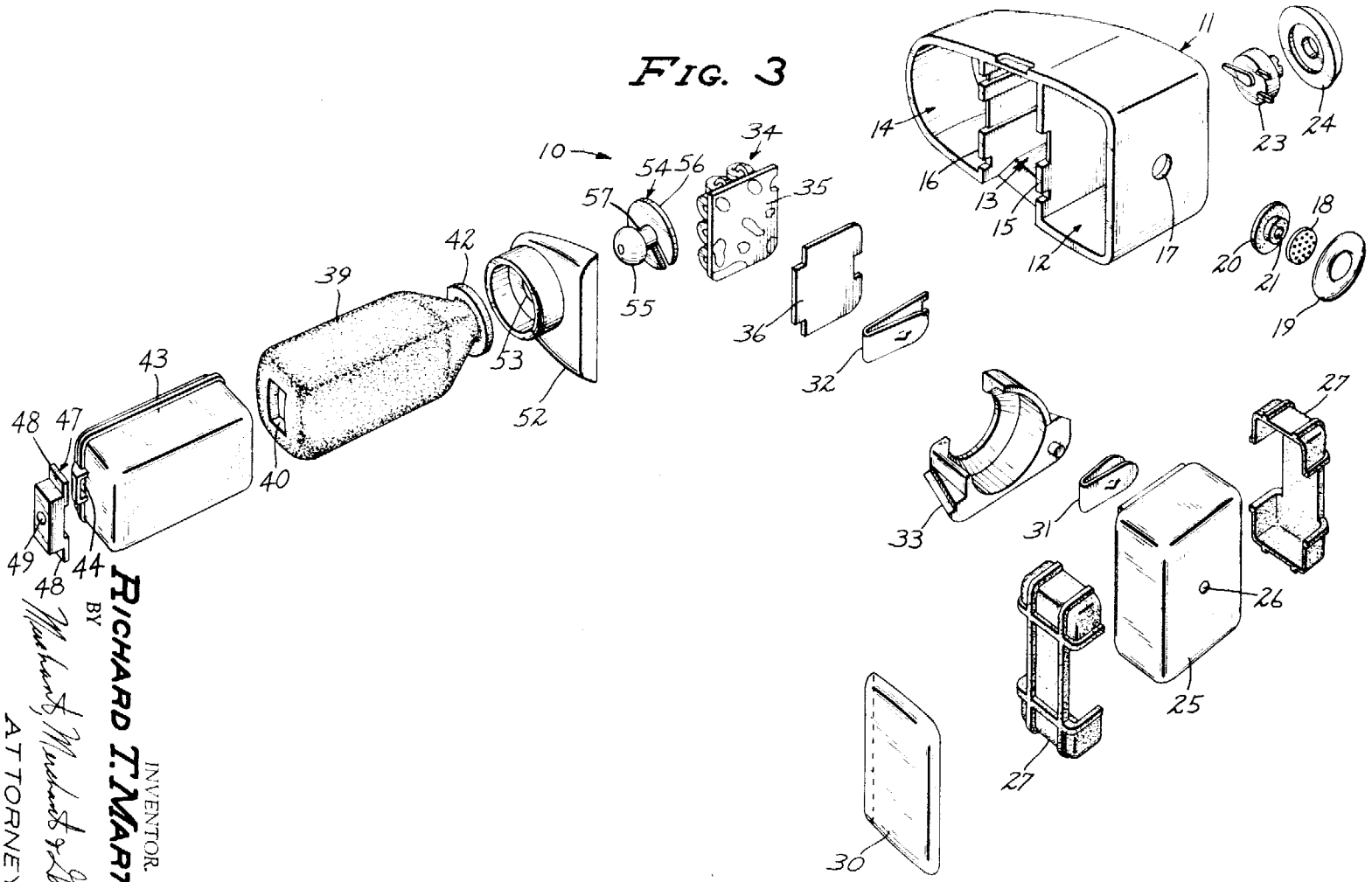
FIG. 3 is an exploded view of the present invention shown in perspective.

Referring to the drawings, there is shown a hearing aid 10 comprising a housing 11 adapted to be worn in the external ear of the user, housing 11 being divided into a first compartment 12, a center compartment 13, and a second end compartment 14. End compartment 12 is separated from center compartment 13 by a wall 15;

while end compartment 14 is separated from center compartment 13 by a wall 16.

An aperture 17 extends through an outer wall of housing 11 into end compartment 12, aperture 17 having a grommet 20 fitted therein. Grommet 20 in turn has an aperture 21 therethrough. A microphone grill plate 18 is positioned over aperture 17 on the outside of housing 11 and is held in place by means of a cap 19.

An aperture 22 extends through a wall of housing 11 into end compartment 12, aperture 22 having a screw driver adjust potentiometer 23 fitted therein, the screw driver adjustment of potentiometer 23 being protected by a cap 24. A microphone 25, having an acoustic input aperture 26, is shock mounted by means of rubber, or other suitable resilient supporting members, 27, and is positioned in end compartment 12 so that microphone aperture 26 is adjacent aperture 21 of grommet 20. End compartment 12 is sealed by means of the cover plate 30.

A first conducting plate 31 is clipped over wall 15 and extends along the face of wall 15 in center compartment 13, while a second conducting plate 32 is clipped over wall 16 and extends along wall 16 in the center compartment 13. A generally arcuate, wafer type battery holder 33 is pivotally mounted between walls 15 and 16 and swings closed into center compartment 13 of housing 11. Battery holder 33 is adapted to hold a wafer type battery (not shown) which makes electrical contact with the conducting plates 31 and 32 when the battery compartment 33 is in a closed position within the center compartment 13 of housing 11.

An amplifier circuit shown generally at 34, is mounted on a printed circuit board 35. Amplifier 34 can be of any conventional audio-amplifier design and the details of a particular amplifier design are not shown. Amplifier 34 and printed circuit board 35 are mounted in end compartment 14 and are insulated from the conducting plate 32 by means of an insulating spacer 36. Suitable conducting means (not shown) connect the microphone 25 to the input of amplifier 34, and in addition connect the battery conducting plates 31 and 32 to amplifier 34 to provide an energizing source for the amplifier.

An elongated hollow boot 39 is formed from rubber, or other suitable soft resilient material, and has an aperture 40 at one end thereof and an aperture 41 at the opposite end thereof. Aperture end 41 of boot 39 has a tapered neck portion which terminates in an external lip 42.

An elongated receiver member 43 has an acoustic output aperture 44 at one end thereof, receiver member 43 being capable of producing an acoustic output when energized. Receiver member 43 further has energizing terminals 45 and 46. The elongated receiver member 43 is mounted inside of the hollow resilient boot 39 so that the acoustic output aperture 44 of receiver 43 is adjacent the aperture 40 of boot 39. The resilient boot-covered receiver 43 is adapted to be inserted in the ear canal of the user so that the acoustic output aperture 44 of receiver 43 is adjacent the user's eardrum. A rigid protection plate 47 having flanged edges 48 is positioned in aperture 40 of boot 39, the flanged edges 48 of plate 47 being sandwiched between the end of boot 39 and the end of receiver 43. Plate 47 has an aperture 49 therethrough, the axis of aperture 49 being generally perpendicular to the acoustic output aperture 44 of receiver 43 and offset therefrom.

A wall plate 52 seals end compartment 14 of housing 11. Plate 52 has an aperture 53 therethrough, the diameter of aperture 53 being less than the normal diameter of the exterior lip 42 of boot 39. Since boot 39 is highly resilient, the exterior lip 42 can be compressed and forced through aperture 53 of wall plate 52, boot 39 then being held in place by exterior lip 42. A locking member 54 comprises a knob portion 55 which is separated from one face of a plate 56 by means of a shaft portion 57. The maximum diameter of the knob portion 55 of locking member 54 is less than the diameter of aperture 53 of wall plate 52 but is greater than the normal diameter of the aperture 41 of boot 39. The diameter of the shaft portion 57 of locking member 54 is substantially equal to the diameter of the aperture 41 of boot member 39. The diameter of the plate 56 of locking member 54 is greater than the diameter of aperture 53 of wall plate 52. Knob portion 55, shaft portion 57, and plate 56 are all axially aligned, and an aperture 58 extends axially therethrough.

The knob portion 55 of locking member 54 is forced through the aperture 41 of boot member 39 and hence locks the boot member 39 in position in aperture 53 of wall portion 52 by pinching the tapered portion of boot 39 between shaft 57 of locking member 54 and the edge of aperture 53 of wall plate 52. Since boot member 39 is highly resilient, it will be seen that the boot 39 and receiver 43 are pivotally mounted in aperture 53 of wall plate 52 and hence is free to move or pivot as the boot 39 is inserted in the ear canal of the user.

A first conductor 61 and a second conductor 62 are connected to energizing terminals 45 and 46 of receiver 43, respectively, and extend through aperture 58 of locking member 54 and are connected to the output of amplifier 34.

In operation, the housing 11 of hearing aid 10 is worn in the exterior ear of the user while the flexible boot 39 and receiver 43 are inserted in the ear canal of the user so that aperture 49 of protection plate 47 is adjacent the user's eardrum. As sound is picked by microphone 25 it is amplified by amplifier 34 and fed to receiver 43 which transforms the electrical signal into acoustic energy at the acoustic output aperture 44 of receiver 43. This acoustic energy travels through aperture 49 of protection plate 47 and energizes the eardrum of the user. It will be noted that because of the aperture 49 in protection plate 47 the acoustic output of receiver 43 is always traveling in the same acoustic medium, that is, air; and hence, there is not a large acoustic loss due to a change in acoustic medium. Furthermore, since the microphone compartment 12 and the amplifier compartment 14 are separated by the battery compartment 13, any tendency for feed back between the amplifier and microphone is minimized.

It has been found that due to the large variance in the size of the ear canal of various users, it is sometimes difficult for users to keep the hearing aid, and particularly the boot 39 and receiver 43, in the ear canal. To overcome this problem various configuration tips 63 were designed to fit over boot 39. These tips 63 are made of very soft rubber, or other suitable soft resilient material, and can be shaped to conform to the ear canal of the individual user. Since the soft resilient tips 63 can be fitted to the boot 39 and the user's ear canal at the time the hearing aid is purchased, the hearing aid can originally be manufactured with a standard size boot, and hence, the need for manufacturing hearing aids with various size and configuration boot and receiver members is eliminated.

It is to be understood that while I have shown a specific embodiment of my invention that this is for the purpose of illustration only and that my invention is to be limited solely by the scope of the appended claims.

What I claim is:

1. An in-the-ear hearing aid comprising:

(a) a housing adapted to be fitted into the ear of the user, said housing containing a microphone and amplifier connected in operable relationship;

(b) a soft resilient elongated hollow boot having a first aperture at one end thereof and a second aperture at the opposite end thereof, said opposite end of the boot being tapered and terminating in an external lip;

(c) an elongated receiver member capable of producing an acoustic output from one end thereof, said receiver being mounted inside of said hollow resilient boot so that the acoustic output end of said receiver is adjacent the first aperture of said boot, the boot and receiver adapted for insertion in the ear canal of the user with the first aperture adjacent the eardrum of the user;

(d) a third aperture through the wall of said housing, the diameter of said third aperture being less than the normal diameter of the exterior lip of said boot, said other end of the boot being positioned through said third aperture and held therein by said exterior lip;

(e) a locking member comprising a knob portion separated from one face of a plate by means of a shaft portion, the maximum diameter of the knob portion being less than the diameter of said third aperture but greater than the normal diameter of said second aperture, the diameter of said shaft portion being substantially equal to the diameter of said second aperture, and the diameter of said plate being larger than the diameter of said third aperture, said locking member having a fourth aperture extending through the plate and shaft and knob portions thereof, the knob portion of said locking member being forced through the second aperture of said boot to lock the other end of the boot in said third aperture;

(f) and conductor means extending through said fourth aperture and connecting the output of said amplifier to said receiver.

2. An in-the-ear hearing aid comprising:

(a) a housing adapted to be fitted into the ear of the user, said housing containing a microphone and amplifier connected in operable relationship;

(b) an elongated hollow boot having a first aperture at one end thereof and a second aperture at the opposite end thereof, said opposite end of the boot being tapered and terminating in an external lip;

(c) an elongated receiver member capable of producing an acoustic output from one end thereof, said receiver being mounted inside of said hollow resilient boot so that the acoustic output end of said receiver is adjacent the first aperture of said boot, the boot and receiver adapted for insertion in the ear canal of the user with the second aperture adjacent the eardrum of the user;

(d) a third aperture through the wall of said housing, the diameter of said third aperture being less than the normal diameter of the exterior lip of said boot, said other end of the boot being positioned through said third aperture and held therein by said exterior lip;

(e) a locking member comprising a knob portion separated from one face of a plate by means of a shaft portion, the maximum diameter of the knob portion being less than the diameter of said third aperture but greater than the normal diameter of said second aperture, the diameter of said shaft portion substantially equal to the diameter of said second aperture, and the diameter of said plate being larger than the diameter of said third aperture, said locking member having a fourth aperture extending through the plate and shaft and knob portions thereof, the knob portion of said locking member being forced through the second aperture of said boot to lock the other end of the boot in said third aperture;

(f) conductor means extending through said fourth aperture and connecting the output of said amplifier to said receiver;

(g) and a soft resilient tip fitted over the boot and receiver and fitted to the shape of the ear canal of the user to hold said boot and receiver therein.

3. An in-the-ear hearing aid comprising:

(a) a housing adapted to be fitted into the ear of the user, said housing being divided into first and second end compartments and a center compartment;

(b) a first aperture through one of the outer walls of said first end compartment;

(c) a microphone mounted in said first end compartment adjacent said first aperture;

(d) an amplifier mounted in said second end compartment, said amplifier having an input and an output;

(e) means connecting said microphone to the input of said amplifier;

(f) a battery mounted in said center compartment and connected to said amplifier to provide an energizing source for the amplifier;

(g) an elongated receiver member capable of producing an acoustic output from one end thereof and adapted for insertion in the ear canal of the user with said one end adjacent the eardrum of the user;

(h) a second aperture through one of the outer walls of said second end compartment;

(i) means pivotally mounting the other end of said receiver to said housing adjacent said second aperture;

(j) conductor means extending through said second aperture and connecting the output of said amplifier to said receiver;

(k) and a soft resilient tip fitted over the receiver and fitted to the shape of the ear channel of the user to hold said receiver therein.

4. An in-the-ear hearing aid comprising:

(a) a housing adapted to be fitted into the ear of the user;

(b) a first aperture through one of the walls of said housing;

(c) a microphone in said housing adjacent said first aperture;

(d) an amplifier mounted in said housing, said amplifier having an input and an output;

(e) means connecting said microphone to the input of said amplifier;

(f) a battery mounted in said housing and connected to said amplifier to provide an energizing source therefor;

(g) a soft resilient elongated hollow boot having a second aperture at one end thereof and a third aperture at the opposite end thereof [, said opposite end of the boot being tapered and terminating in an external lip];

(h) an elongated receiver member capable of producing an acoustic output from one end thereof, said receiver being mounted inside of said hollow resilient boot so that the acoustic output end of said receiver is adjacent the second aperture of said boot, said boot and receiver adapted for insertion in the ear canal of the user with the second aperture adjacent the eardrum of the user;

(i) a fourth aperture through one of the walls of said housing, said other end of the boot being positioned through said fourth aperture;

(j) locking means connected to prevent withdrawal of said other end of the boot from said fourth aperture;

(k) and conductor means extending through said third aperture and connecting the output of said amplifier to said receiver.

5. An in-the-ear hearing aid comprising:

(a) a housing adapted to be fitted into the ear of the user, said housing being divided into first and second end compartments and a center compartment;

(b) a first aperture through one of the outer walls of said first end compartment;

(c) a microphone mounted in said first end compartment adjacent said first aperture;

(d) an amplifier mounted in said second end compartment, said amplifier having an input and an output;

(e) means connecting said microphone to the input of said amplifier;

(f) a battery mounted in said center compartment;

(g) conducting means connecting said battery to said amplifier to provide an energizing source for the amplifier;

(h) a soft resilient elongated hollow boot having a second aperture at one end thereof and a third aperture at the opposite end thereof, said opposite end of the boot being tapered and terminating in an external lip;

(i) an elongated receiver member capable of producing an acoustic output from one end thereof, said receiver being mounted inside of said hollow resilient boot so that the acoustic output end of said receiver is adjacent the second aperture of said boot, said boot and receiver adapted for insertion in the ear canal of the user with the second aperture adjacent the eardrum of the user;

(j) a fourth aperture through one of the outer walls of said second end compartment, diameter of said fourth aperture being less than the normal diameter of the exterior lip of said boot, said other end of the boot being positioned through said fourth aperture and held therein by said exterior lip;

(k) a locking member comprising a knob portion separated from one face of a plate by means of a shaft portion, the maximum diameter of the knob portion being less than the diameter of said fourth aperture but greater than the normal diameter of said third aperture, the diameter of said shaft portion being substantially equal to the diameter of said third aperture, and the diameter of said plate being larger than the diameter of said fourth aperture, said locking member having a fifth aperture extending through the plate and shaft and knob portions thereof, the knob portion of said locking member being forced through the third aperture of said boot to lock the other end of the boot in said fourth aperture;

(l) and conductor means extending through said fifth aperture and connecting the output of said amplifier to said receiver.

6. An in-the-ear hearing aid comprising:

(a) a housing adapted to be fitted into the ear of the user;

(b) a first aperture through one of the walls of said housing;

(c) a microphone mounted in said housing adjacent said first aperture;

(d) an amplifier mounted in said housing, said amplifier having an input and an output;

(e) means connecting said microphone to the input of said amplifier;

(f) a battery mounted in said housing and connected to said amplifier to provide an energizing source therefor;

(g) a soft resilient elongated hollow boot having a second aperture at one end thereof and a third aperture at the opposite end thereof, said opposite end of the boot being tapered and terminating in an external lip;

(h) an elongated receiver member capable of producing an acoustic output from one end thereof, said receiver being mounted inside of said hollow resilient boot so that the acoustic output end of said receiver is adjacent the second aperture of said boot, said boot and receiver adapted for insertion in the ear canal of the user with the second aperture adjacent the eardrum of the user;

(i) a rigid protection plate mounted in the second aperture of said boot, said protection plate having a fourth aperture therethrough;

(j) a fifth aperture through one of the walls of said housing, the diameter of said fifth aperture being less than the normal diameter of the exterior lip of said boot, said other end of the boot being positioned through said fifth aperture and held therein by said exterior lip;

(k) a locking member comprising a knob portion separated from one face of a plate by means of a shaft portion, the maximum diameter of the knob portion being less than the diameter of said fifth aperture but greater than the normal diameter of said third aperture, the diameter of said shaft portion being substantially equal to the diameter of said third aperture and the diameter of said plate being larger than the diameter of said fifth aperture, said locking member having a sixth aperture extending through the plate and shaft and knob portions thereof, the knob portion of said locking member being forced through the third aperture of said boot to lock the other end of the boot in said fifth aperture;

(l) said conductor means extending through said sixth aperture and connecting the output of said amplifier to said receiver.

7. An in-the-ear hearing aid comprising:

(a) a housing adapted to be fitted into the ear of the user, said housing being divided into first and second end compartments and a center compartment;

(b) a first aperture through one of the outer walls of said first end compartment;

(c) a microphone mounted in said first end compartment adjacent said first aperture;

(d) an amplifier mounted in said second end compartment, said amplifier having an input and an output;

(e) means connecting said microphone to the input of said amplifier;

(f) a battery mounted in said center compartment;

(g) conducting means connecting said battery to said amplifier to provide an energizing source for the amplifier;

(h) a soft resilient elongated hollow boot having a second aperture at one end thereof and a third aperture at the opposite end thereof, said opposite end of the boot being tapered and terminating in an external lip;

(i) an elongated receiver member capable of producing an acoustic output from one end thereof, said receiver being mounted inside of said hollow resilient boot so that the acoustic output end of said receiver is adjacent the second aperture of said boot, said boot and receiver adapted for insertion in the ear canal of the user with the second aperture adjacent the eardrum of the user;

(j) a fourth aperture through one of the outer walls of said second end compartment, diameter of said fourth aperture being less than the normal diameter of the exterior lip of said boot, said other end of the boot being positioned through said fourth aperture and held therein by said exterior lip;

(k) locking means connected to said other end of the boot to prevent withdrawal of the boot from said fourth aperture;

(l) and conductor means connecting the output of said amplifier to said receiver.

8. An in-the-ear hearing aid comprising:

(a) a housing adapted to be fitted into the ear of the user, said housing being divided into first and second end compartments and a center compartment;

(b) a first aperture through one of the outer walls of said first end compartment;

(c) a microphone mounted in said first end compartment adjacent said first aperture;

(d) an amplifier mounted in said second end compartment, said amplifier having an input and an output;

(e) means connecting said microphone to the input of said amplifier;

(f) conducting plates mounted on the walls of said center compartment separating the center compartment from said first and second end compartments;

(g) a wafer type battery mounted in said center compartment in electrical contact with said conducting plates;

(h) conducting means connecting said conducting plates to said amplifier to provide an energizing source for the amplifier;

(i) a soft resilient elongated hollow boot having a second aperture at one end thereof and a third aperture at the opposite end thereof, said opposite end of the boot being tapered and terminating in an external lip;

(j) an elongated receiver member capable of producing an acoustic output from one end thereof, said receiver being mounted inside of said hollow resilient boot so that the acoustic output end of said receiver is adjacent the second aperture of said boot, the boot and receiver adapted for insertion in the ear canal of the user with the second aperture adjacent the eardrum of the user;

(k) a rigid protection plate mounted in the second aperture of said boot, said protection plate having a fourth aperture therethrough;

(l) a fifth aperture through one of the outer walls of said second end compartment, the diameter of said fifth aperture being less than the normal diameter of the exterior lip of said boot, said other end of the boot being positioned through said fifth aperture and held therein by said exterior lip;

(m) a locking comprising a knob portion separated from one face of a plate by means of a shaft portion, the maximum diameter of the knob portion being less than the diameter of said fifth aperture but greater than the normal diameter of said third aperture, the diameter of said shaft portion being substantially equal to the diameter of said third aperture, and the diameter of said plate being larger than the diameter of said fifth aperture, said locking member having a sixth aperture extending through the plate and shaft and knob portions thereof, the knob portion of said locking member being forced through the third aperture of said boot to lock the other end of the boot in said fifth aperture;

(n) and conductor means extending through said sixth aperture and connecting the output of said amplifier to the receiver.

9. An in-the-ear hearing aid comprising:

(a) a housing adapted to be fitted into the ear of the user, said housing being divided into first and second end compartments and a center compartment;

(b) a first aperture through one of the outer walls of said first end compartment;

(c) a microphone mounted in said first end compartment adjacent said first aperture;

(d) an amplifier mounted in said second end compartment, said amplifier having an input and an output;

(e) means connecting said microphone to the input of said amplifier;

(f) conducting plates mounted on the walls of said center compartment separating the center compartment from said first and second end compartments;

(g) a wafer type battery mounted in said center compartment in electrical contact with said conducting plates;

(h) conducting means connecting said conducting plates to said amplifier to provide an energizing source for the amplifier;

(i) a soft resilient elongated hollow boot having a second aperture at one end thereof and a third aperture at the opposite end thereof, said opposite end of the boot being tapered and terminating in an external lip;

(j) an elongated receiver member capable of producing an acoustic output from one end thereof, said receiver being mounted inside of said hollow resilient boot so that the acoustic output end of said receiver is adjacent the second aperture of said boot, said boot and receiver adapted for insertion in the ear canal of the user with the second aperture adjacent the eardrum of the user;

(k) a rigid protection plate mounted in the second aperture of said boot, said protection plate having a fourth aperture therethrough;

(l) a fifth aperture through one of the outer walls of said second end compartment, diameter of said fifth aperture being less than the normal diameter of the exterior lip of said boot, said other end of the boot being positioned through said fifth aperture and held herein by said exterior lip;

(m) a locking member comprising a knob portion separated from one face of a plate by means of a shaft portion, the maximum diameter of the knob portion being less than the diameter of said fifth aperture but greater than the normal diameter of said fourth aperture, the diameter of said shaft portion being substantially equal to the diameter of said fourth aperture, and the diameter of said plate being larger than the diameter of said fifth aperture, said locking member having a sixth aperture extending through the plate and shaft and knob portions thereof, the knob portion of said locking member being forced through the fourth aperture of said boot to lock the other end of the boot in said fifth aperture;

(n) conductor means extending through said sixth aperture and connecting the output of said amplifier to said receiver;

(o) and a soft resilient tip fitted over the boot and receiver and fitted to the shape of the ear canal of the user to hold said boot and receiver therein.

10. In an in-the-ear hearing aid having an elongated receiver capable of producing acoustic energy from one end thereof and adapted for insertion in the ear canal of the user with said one end adjacent the eardrum, said receiver being covered by [a soft resilient] *an* elongated hollow [boot] *member* having an aperture adjacent said one end of said receiver, the improvement comprising:

a soft resilient tip removably fitted over said [resilient boot] *hollow member* and fitted to the shape of the ear canal of the user to hold said [boot] *member* covered receiver therein.

*11. An in-the-ear hearing aid comprising:*

*(a) a housing adapted to be fitted into the ear of the user, one of the walls of said housing forming a housing face;*

*(b) a first aperture through one of the walls of said housing;*

*(c) a microphone in said housing adjacent said first aperture;*

*(d) an amplifier mounted in said housing, said amplifier having an input and an output;*

*(e) means connecting said microphone to the input of said amplifier;*

*(f) a battery mounted in said housing and connected to said amplifier to provide an energizing source therefor;*

*(g) an elongated receiver member capable of providing an acoustic output from one end thereof and adapted for insertion in the ear canal of the user with said one end adjacent the eardrum of the user;*

*(h) a second aperture through said housing face;*

*(i) mounting means for mounting said receiver to said housing adjacent said second aperture on an axis generally perpendicular to said housing face, said mounting means being sufficiently resilient to allow said receiver to be repositioned at a substantial angle relative to said axis; and*

*(j) conductor means extending through said second aperture and connecting the output of said amplifier to said receiver.*

*12. An in-the-ear hearing aid comprising:*

*(a) a housing adapted to be fitted into the ear of the user, one of the walls of said housing forming a housing face;*

*(b) a first aperture through one of the walls of said housing;*

*(c) a mircrophone in said housing adjacent said first aperture;*

*(d) an amplifier mounted in said housing, said amplifier having an input and an output;*

*(e) means connecting said microphone to the input of said amplifier;*

*(f) a battery mounted in said housing and connected to said amplifier to provide an energizing source therefor;*

*(g) an elongated receiver member capable of providing an acoustic output from one end thereof and adapted for insertion in the ear canal of the user with said one end adjacent the eardrum of the user;*

*(h) a second aperture through said housing face;*

*(i) mounting means for mounting said receiver to said housing adjacent said second aperture on an axis generally perpendicular to said housing face, said mounting means being sufficiently resilient to allow said receiver to be repositioned at a substantial angle relative to said axis;*

*(j) conductor means extending through said second aperture and connecting the output of said amplifier to said receiver; and*

*(k) a soft resilient tip fitted over said receiver and fitted to the shape of the ear canal of the user to hold said receiver therein.*

References Cited

The following references, cited by the Examiner, are of record in the patented file of this patent or the original patent.

UNITED STATES PATENTS

| | | | |
|---|---|---|---|
| 2,430,229 | 11/1947 | Kelsey | 179—182 |
| 2,487,038 | 11/1949 | Baum | 179—107 |
| 2,967,913 | 1/1961 | Aubert et al. | 179—107 |
| 3,061,689 | 10/1962 | McCarrell | 179—107 |

FOREIGN PATENTS

| | | |
|---|---|---|
| 1,109,737 | 6/1961 | Germany. |
| 598,919 | 10/1959 | Italy. |

KATHLEEN H. CLAFFY, *Primary Examiner.*

R. N. CARTEN, *Assistant Examiner.*